United States Patent [19]

Matsubara et al.

[11] 4,145,338

[45] Mar. 20, 1979

[54] PLASTICIZED POLYVINYL ACETATE COMPOSITIONS

[75] Inventors: Saburo Matsubara, Yokohama; Sakuya Iwai, Tokyo, both of Japan

[73] Assignee: Nippon Oil Co., Ltd., Japan

[21] Appl. No.: 862,429

[22] Filed: Dec. 20, 1977

[30] Foreign Application Priority Data

Dec. 22, 1976 [JP] Japan .................................. 51-155490

[51] Int. Cl.$^2$ ............................................... C08K 5/01
[52] U.S. Cl. .................................. 260/33.6 UA; 526/1
[58] Field of Search ..................... 526/1; 260/33.6 UA

[56] References Cited

U.S. PATENT DOCUMENTS

| 3,011,990 | 12/1961 | Roh et al. ..................... 260/33.6 UA |
| 3,061,572 | 10/1962 | Packer .......................... 260/33.6 UA |
| 3,595,776 | 7/1971 | Davidson et al. ............ 260/33.6 UA |
| 3,833,680 | 9/1974 | Torii ............................. 260/33.6 UA |

*Primary Examiner*—Ronald W. Griffin
*Attorney, Agent, or Firm*—Bucknam and Archer

[57] ABSTRACT

Polyvinyl acetate compositions are provided for use as adhesive and coating agents and contain plasticizers readily available from aromatic compounds, which plasticizers are highly compatible with polyvinyl acetate and free of toxic components.

5 Claims, No Drawings

PLASTICIZED POLYVINYL ACETATE COMPOSITIONS

BACKGROUND OF THE INVENTION

1. Field of the Invention

This invention relates to polyvinyl acetate compositions, more particularly to such compositions which comprise solutions or emulsions of polyvinyl acetate or polyvinyl acetate copolymers and certain classes of plasticizers.

2. Description of the Prior Art

Generally, polyvinyl acetate compositions have found wide application as adhesive agents in the form of either a solution or an emulsion for wooden crafts, paper packaging, corrugated cardboards, fibers, leathers, plastic film laminates and the like, or as surface-coating agents for structural surfaces of metal, wood, concrete, paper and the like.

Emulsion-type adhesive compounds have been found advantageous over solvent-type adhesive compounds in that the former can obtain more solid content, can dry faster, have better workability, and are less flammable. The emulsion-type adhesives are capable of forming a homogeneous, transparent, continuous film when the polymer particles dispersed in water approach toward each other as the water evaporates and finally fuse together as the water content becomes substantially nil. However, the emulsion-type adhesives are susceptible to "whitening" with decreasing temperature. A minimum temperature at which emulsions can dry and form a homogeneous, transparent film is generally defined as Minimum Film Forming Temperature (MFT). It is known that MFT of polyvinyl acetate emulsions though variable with their composition is in the range of 5°–20° C. If, therefore, films of the desired properties are to be obtained under nearly zero degree temperature conditions as at a winter season, it becomes necessary to use some plasticizers which are compatible with polyvinyl acetate. Such plasticizers can improve the low temperature characteristics as well as the shock-resistant properties. Typical examples of such plasticizers are phthalate esters such as dibutyl phthalate (DBP) and dioctyl phthalate (DOP), and further include various phenols. DBP has found greater application for its excellent compatibility with polyvinyl acetate and its availability at lower cost. On the other hand, the use of DBP containing phthalate ester bonds has recently been objected to primarily on account of its great toxic hazard. Extensive research has therefore been made to explore possible sources of plasticizing materials which are inexpensive and yet highly compatible with polyvinyl acetate. However, none of such plasticizers has yet been found.

SUMMARY OF THE INVENTION

Whereas, it is an object of the present invention to provide improved polyvinyl acetate compositions which can be readily used as adhesives, coatings, film-forming agents or the like without involving any toxic or poisonous aftermath.

It is a more specific object of the invention to provide a class of plasticizers which are highly compatible with polyvinyl acetate and yet contain no phthalate ester bonds, or chlorine, hydroxyl or other toxic groups.

According to the invention, there is provided a polyvinyl acetate composition comprising:

(I) 100 parts by weight of polyvinyl acetate or polyvinyl acetate copolymer; and (II) 0.1 to 50 parts by weight of one or more of plasticizers selected from the compounds defined by the formulae:

$$Ar_1 - R - Ar_2 \quad (i)$$

where $Ar_1$ and $Ar_2$ are the same or different benzene or alkylbenzene rings, and R is an alkylene group having a carbon number of 2 to 3, the compounds of this formula having a molecular weight of from 173 to 263;

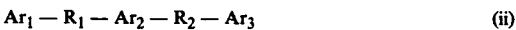
$$Ar_1 - R_1 - Ar_2 - R_2 - Ar_3 \quad (ii)$$

where $Ar_1$, $Ar_2$ and $Ar_3$ are the same or different benzene or alkylbenzene rings, and $R_1$ and $R_2$ are the same or different alkylene groups having a carbon number of 2 to 3, the compounds of this formula having a molecular weight of from 300 to 398; and

(iii)

where $Ar_1$, $Ar_2$ and $Ar_3$ are the same or different benzene or alkylbenzene rings, and R is a straight-chain or branched-chain hydrocarbon group having a carbon number of 4 to 6, the compounds of this formula having a molecular weight of from 300 to 398.

DETAILED DESCRIPTION OF THE PREFERRED EMBODIMENTS

The polyvinyl acetate or polyvinyl acetate copolymer contemplated herein may be prepared by an ordinary solution polymerization using alcohol, acetic acid ester, toluene or the like solvents.

An ordinary emulsion polymerization may be also employed in the presence of surface-active agents or hydrophollic protective colloids for the preparation of a polyvinyl acetate emulsion or a polyvinyl acetate copolymer emulsion. A typical example of such protective colloids is polyvinyl alcohol. This may be coused with naturally occurring polymeric materials such as starch and casein, or cellulose derivatives such as hydroxyethyl cellulose, methyl cellulose and carboxymethyl cellulose. Preferred amounts of such protective colloids are usually from 2 to 30 weight percent based on the resin of the polyvinyl acetate emulsion or polyvinyl acetate copolymer emulsion.

The polyvinyl acetate copolymer according to the invention may be obtained from the polymerization of vinyl acetate and one or more monomers copolymerizable therewith, such monomers including unsaturated monocarboxylic acids such as acrylic acid esters, methacrylic acid esters, acrylic acid, methacrylic acid and crotonic acid, unsaturated dicarboxylic acids such as itaconic acid, maleic acid and fumaric acid, functional monomers such as N-methylolacrylamide and glycidyl methacrylate, vinyl monomers such as vinyl propionate and vinyl chloride, ethylene and vinylidene chloride.

The above-defined plasticizers which constitute an important aspect of the invention may be prepared with ease and at low cost from aromatic compounds readily available in the petrochemical industry. There are various processes which may be employed for the production of the plasticizers. One such process is to react styrene, α-methylstyrene, or their alkyl-substituents with benzene or alkylbenzene in the presence of acidic catalysts such as sulfuric acid or cation-exchange resins. Another process is to dehydrochlorinate and condensate aryl chloride and benzene or alkylbenzene in the presence of Friedel-Crafts catalysts. While there may be considered other suitable processes, the most preferred one is to react styrene with alkylbenzene such as xylene in the presence of acidic catalysts, whereby mixtures of the above-listed compounds (i), (ii) and (iii) can be obtained. Such mixtures may be put to use as they are, or they may be fractionated by distillation into individual compounds or mixtures of two or more of such compounds.

Typical examples of the plasticizing compounds are α-methylbenzyl toluene, α-,α'-dimethylbenzyl toluene, α-methylbenzyl xylene, α-,α'-dimethylbenzyl xylene, bis-(α-methylbenzyl) toluene, bis-(α-methylbenzyl) xylene, bis-(α,α'-dimethylbenzyl) toluene, bis-(α,α'-dimethylbenzyl) xylene, α-methylbenzyl-α-methyl (dimethyl) benzyl-benzene, 1-phenyl-1-xylyl-3-phenylbutane, and 1,3,5-triphenylhexane.

It is to be noted that the molecular weights of the plasticizing compounds should come within the ranges specified in the formulae (i), (ii) and (iii), respectively. Departures upward from the specified ranges would result in too viscous or otherwise solid mass, while departures downward would result in too volatile compounds.

In the practice of the invention, it is preferred to use the compounds (i) per se or mixtures thereof, or to co-use the compounds (ii) and/or (iii) or mixtures thereof in amounts of 50 weight % based on the compounds (i) or mixtures thereof.

The amount of the plasticizers to be added should vary with the particular purpose for which the eventual compositions are to be used. It is generally of the order of 0.1 to 50 parts by weight, preferably 0.5 to 30 parts by weight based on 100 parts by weight of starting polyvinyl acetate or polyvinyl acetate copolymers.

It is possible to blend small amounts of conventional plasticizers, or to add aging-inhibitors, antioxidants, fillers such as calcium carbonate, clay and flour, mildew-proofing agents, and other additives as are required.

The plasticizers obtained by solution polymerization may be readily admixed with the starting polymer as they are or in the form of a solution. Whereas, the plasticizers obtained by emulsion polymerization should be added little by little at from room temperature to 70° C. with stirring to make a homogeneous composition.

The advantages accruing from the use of the plasticizers provided in accordance with the invention are that the problem of toxic hazard which is encountered in the actual application of the coating or adhesive compositions can be substantially eliminated or alleviated because the plasticizers are free of heavy metals, chlorine, phthalate ester compounds or other toxic materials. An experiment with a mouse has indicated that the LD$_{50}$ value by oral administration of distyrenated xylene resulting from the reaction of styrene with ortho-xylene is as low as 9.445 g/kg.

The invention will be further described by way of the following examples.

EXAMPLE 1

Ortho-xylene and styrene were reacted in the presence of a sulfuric acid catalyst. The reaction product was subjected to precise fractionation thereby producing a compound of the formula (i) consisting chiefly of α-methylbenzyl xylene and having an average molecular weight of 210.

EXAMPLE 2

C$_8$ aromatic hydrocarbon (32.8% ortho-xylene, 37.6% methaxylene, 19.6% para-xylene and 10.0% ethylbenzene) was styrenated in the presence of a sulfuric acid catalyst thereby producing a compound of the formula (i) consisting chiefly of α-methylbenzyl xylene mixture and having an average molecular weight of 210.

EXAMPLE 3

The reaction product obtained by the procedure of Inventive Example 1 was fractionated to produce a compound of the formula (i) having an average molecular weight of 241. To the resulting compound was added a mixture of compounds of the formulae (ii) and (iii) in an amount of 30 weight % based on α-methylbenzyl xylene of the formula (i).

The plasticizers prepared in the foregoing examples were tested for their compatibility with polyvinyl acetate and plasticizing efficacy in accordance with the procedures hereafter described. For purposes of comparison, conventional plasticizers, i.e. DBP, DOP and alkylnaphthalene-type plasticizer hereafter referred to as KMCA (manufactured by Kureha Chemical Industries, Ltd.), respectively, were also tested under the same conditions employed for the testing of the plasticizers of the invention.

(1) Compatibility.

Polyvinyl acetate having a polymerization degree of 1,400 to 1,600 and predetermined amounts of each of the above respective plasticizers were dissolved in ethyl acetate containing 50 weight % solid. The resulting solution was coated on a glass plate and dried at room temperature. Transparency of the coated film upon drying was taken as a measure of compatibility of each plasticizer with polyvinyl acetate.

Table 1

| Compatibility of Plasticizers with Polyvinyl acetate | | | | |
|---|---|---|---|---|
| Amounts of plasticizers (wt. %) | 10 | 15 | 20 | 30 |
| Example 1 | O | O | O | O |
| Example 2 | O | O | O | O |
| Example 3 | O | O | O | O |
| DBP | O | O | O | O |
| DOP | X | X | X | X |
| KMCA | X | X | X | X |

Note:
O indicates that the coated film is transparent, meaning that the plasticizer is highly compatible with polyvinyl acetate.
X indicates that the coated film is opaque, meaning that the plasticizer is incompatible with polyvinyl acetate.

(2) Plasticizing Efficacy (I)

The solution prepared as per the procedure described in Compatibility (1) above was coated on a release paper to a thickness of about 0.2 mm as measured upon drying and disposed for 3 days at room temperature. The thus coated paper was further vacuum-dried for 5 hours. Thereafter, the coated film was tested for tensile strength (kg/cm$^2$) and elongation (%) using a dumbbel specimen (specified by Japanese Industrial Standards), at a tensile speed of 200 mm/min. and at a temperature of 20°±1° C.

Table 2

| | Plasticizing Efficacy (Tensile Characteristics) | | | | | |
|---|---|---|---|---|---|---|
| | No plasticizer | | 5 wt. % plasticizer | | 10 wt. % plasticizer | |
| | tensile strength (kg/cm²) | elongation (%) | tensile strength (kg/cm²) | elongation (%) | tensile strength (kg/cm²) | elongation (%) |
| Example 1 | | | 70 | 450 | 55 | 500 |
| Example 2 | 120 | 0 | 72 | 450 | 58 | 500 |
| Example 3 | | | 73 | 425 | 66 | 475 |
| DBP | | | 75 | 400 | 70 | 450 |

(3) Plasticizing Efficacy (II)

To an emulsion of polyvinyl acetate, tradenamed "Polysol-LS" manufactured by Showa Kobunshi K.K. and having an MFT of 20° C. was added each of the plasticizers in amounts of 2.5 parts and 5 parts, respectively. The respective admixtures were stirred at 50°-60° C. for 5 hours and thereafter disposed at room temperature for 3 days. The resulting samples were placed in a constant temperature vessel together with a glass plate for more than a hour, and thereafter were coated thinly on the glass plate at the same temperature. The MFT of each sample film was measured, with the results tabulated below.

Table 3

| | Plasticizing Efficacy (II), (MFT) | |
|---|---|---|
| MFT (° C) | 2.5 parts plasticizers (MFT) | 5.0 parts plasticizers (MFT) |
| Example 1 | 8 | 4 |
| Example 2 | 8 | 4 |
| Example 3 | 8 - 10 | 6 - 8 |
| DBP | 8 | 4 |
| DOP | 16 | 14 |
| KMCA | 14 | 14 |

The above tests clearly show that the compositions provided in accordance with the invention are comparable in compatibility and Minimum Film-Forming Temperature (MFT) to compositions containing dibutyl phthalate which has been regarded to be toxic.

What is claimed is:

1. A polyvinyl acetate composition comprising:
(I) 100 parts by weight of polyvinyl acetate or polyvinyl acetate copolymer; and
(II) 0.1 to 50 parts by weight of one or more of plasticizers selected from the compounds defined by the formulae:

$$Ar_1 - R - Ar_2 \quad (i)$$

where $Ar_1$ and $Ar_2$ are the same or different benzene or alkylbenzene rings, and R is an alkylene group having a carbon number of 2 to 3, the compounds of this formula having a molecular weight of from 173 to 263;

$$Ar_1 - R_1 - Ar_2 - R_2 - Ar_3 \quad (ii)$$

where $Ar_1$, $Ar_2$ and $Ar_3$ are the same or different benzene or alkylbenzene rings, and $R_1$ and $R_2$ are the same or different alkylene groups having a carbon number of 2 to 3, the compounds of this formula having a molecular weight of from 300 to 398; and

where $Ar_1$, $Ar_2$ and $Ar_3$ are the same or different benzene or alkylbenzene rings, and R is a straight-chain or branched-chain hydrocarbon group having a carbon number of 4 to 6, the compounds of this formula having a molecular weight of from 300 to 398.

2. A composition as claimed in claim 1 wherein said plasticizers result from the reaction of styrene with alkylbenzene in the presence of acidic catalysts.

3. A composition as claimed in claim 1 wherein said plasticizers are selected from the group consisting of α-methylbenzyl toluene, α-,α'-dimethylbenzyl toluene, α-methylbenzyl xylene, α-,α'-dimethylbenzyl xylene, bis-(α-methylbenzyl) toluene, bis-(α-methylbenzyl) xylene, bis-(α,α'-dimethylbenzyl) toluene, bis-(α,α'-dimethylbenzyl) xylene, α-methylbenzyl-α-methyl (di-methyl) benzyl-benzene, 1-phenyl-1-xylyl-3-phenylbutane, and 1,3,5-triphenylhexane.

4. A composition as claimed in claim 1 wherein the compounds of the formula (ii) and/or the formula (iii) or mixtures thereof are added in amounts of 50 weight % based on the compounds of the formula (i) or mixtures thereof.

5. A composition as claimed in claim 1 wherein said polyvinyl acetate copolymer results from the polymerization of vinyl acetate and at least one monomer copolymerizable therewith, said monomer being (1) ethylene, (2) vinylidene chloride (3) an unsaturated carboxylic acid or a functional derivative thereof which is selected from the group consisting of acrylic acid esters, methacrylic acid esters, acrylic acid, methacrylic acid, crotonic acid, itaconic acid, maleic acid, fumaric acid, N-methylolacrylamide, and glycidyl methacrylate, and (4) other vinyl monomers.

* * * * *